United States Patent [19]

Garnham

[11] Patent Number: 4,610,458
[45] Date of Patent: Sep. 9, 1986

[54] VEHICLE ATTACHABLE CARRIER

[76] Inventor: Robert L. Garnham, 38834 Cheviot, Canton Township, Stark County, Mich. 48188

[21] Appl. No.: 697,394

[22] Filed: Feb. 1, 1985

Related U.S. Application Data

[63] Continuation-in-part of Ser. No. 498,118, May 25, 1983, abandoned.

[51] Int. Cl.$^4$ ............................ B60D 1/06; B60R 9/06
[52] U.S. Cl. ............................ 280/495; 224/420.3 R; 293/117
[58] Field of Search ............... 280/495, 500, 501, 502, 280/456 R; 293/117; 224/42.03 R, 42.03 A, 42.03 B, 42.04, 42.05, 42.06, 42.07, 42.08

[56] References Cited

U.S. PATENT DOCUMENTS

| | | | |
|---|---|---|---|
| 1,451,202 | 4/1923 | Brown | 224/42.03 A |
| 1,755,112 | 4/1930 | Gilmore | 224/42.03 A |
| 2,216,584 | 10/1940 | Boden | 280/495 X |
| 2,408,531 | 10/1946 | Riemann et al. | 280/495 X |
| 3,666,310 | 5/1972 | Burgess et al. | 293/71 R |
| 3,692,345 | 9/1972 | Dumontier | 293/71 R |
| 3,694,018 | 9/1972 | Levering | 293/88 |
| 3,885,817 | 5/1975 | Christian | 280/491 E |
| 3,897,095 | 7/1975 | Glance et al. | 293/71 P |
| 3,938,841 | 2/1976 | Glance et al. | 293/71 R |
| 4,239,253 | 12/1980 | Golze | 280/460 R |

FOREIGN PATENT DOCUMENTS 2607394 8/1977 Fed. Rep. of Germany ...... 280/495

Primary Examiner—John A. Pekar
Attorney, Agent, or Firm—Basile, Weintraub & Hanlon

[57] ABSTRACT

A carrier attachable to a vehicle having a bumper mounted to the vehicle frame via bumper attachment members or a pair of energy absorbing shock absorbers. The carrier includes a pair of straps having a first portion, an integral depending second portion and an outwardly extending, integral third portion. In one embodiment, clamp members, each formed with outwardly extending outer flanges and an intermediate arcuate portion, are securable in an inverted relationship around the energy absorbing shock absorbers and have the first portion of each strap attached thereto such that the second portion of each strap extends downward below the bottom of the vehicle bumper and the third portion of each strap extends outward beyond the vehicle bumper. In another embodiment, a clamp member having a V-shaped center portion is positioned below the energy absorbing shock absorber and fastened to the first portion of each of the straps disposed above the energy absorbing shock absorber to mount the carrier to the energy absorbing shock absorbers to the vehicle. A cross member extends between and adjustably joined to the third portions of each of the straps to adjustably laterally space the straps with respect to the energy absorbing bumper shock absorbers. Various carrying attachments, such as a rack, towing bar, towing hitch, etc., are securable to the third portions of each strap or to the cross member for attaching various articles to the vehicle-attachable carrier.

12 Claims, 8 Drawing Figures

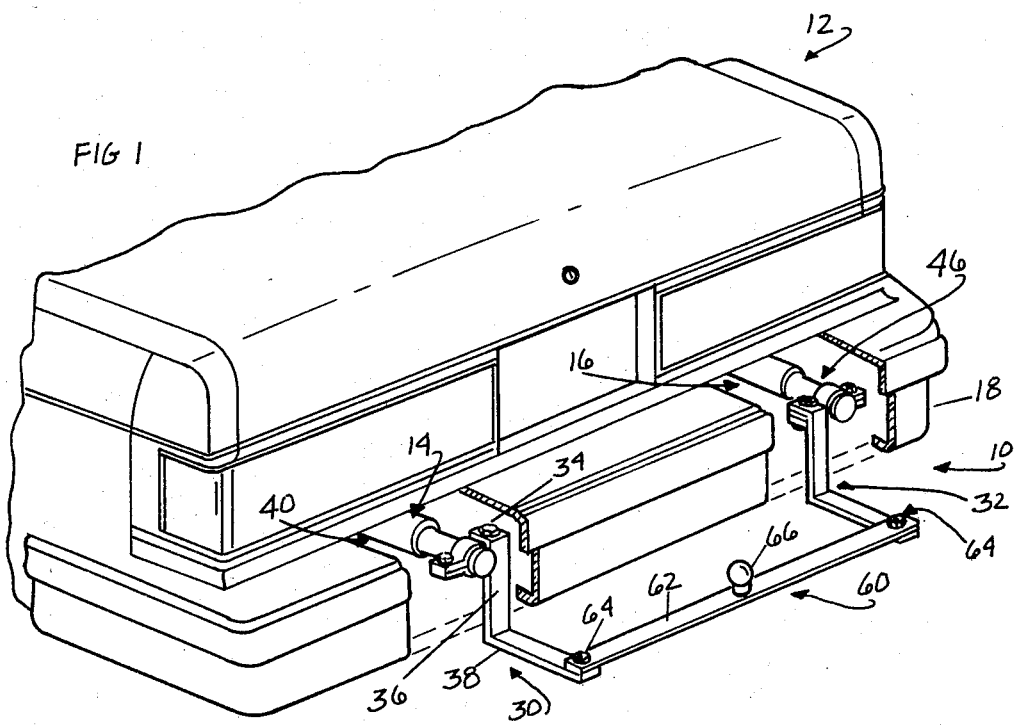
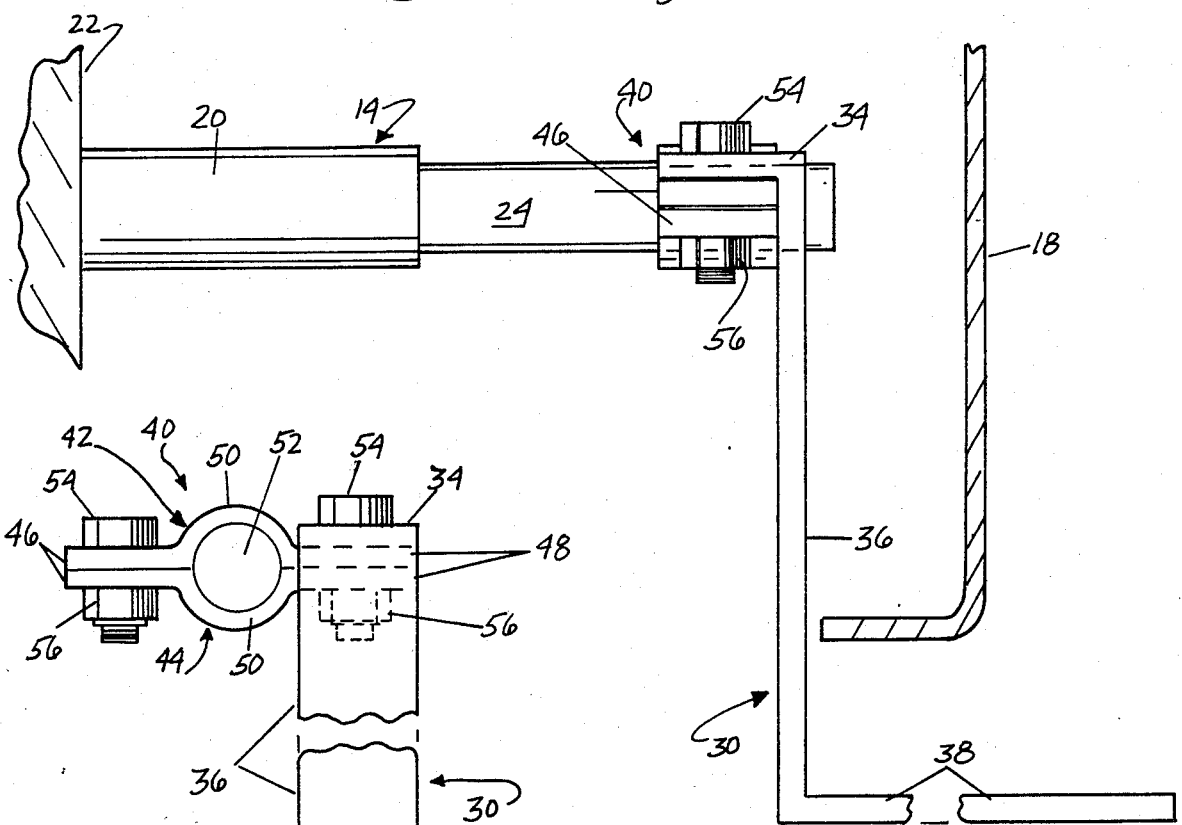

VEHICLE ATTACHABLE CARRIER

CROSS REFERENCE TO CO-PENDING APPLICATION

This application is a continuation-in-part of application Ser. No. 498,118, filed May 25, 1983 in the name of Robert L. Garnham for "VEHICLE ARTICLE CARRIER", now abandoned.

BACKGROUND OF THE INVENTION

1. Field of the Invention:

This invention relates, in general, to vehicles and, more specifically to hitches, carriers and racks which are attachable to vehicles.

2. Description of the Prior Art:

A variety of carriers, racks and hitches have been devised for attachment to a vehicle and, in particular, to an automobile for carrying articles, such as bikes, skis, etc. Such attachments are mounted exteriorly on the vehicle to mount the articles thereon or to provide a hitch for towing a trailer or towing the vehicle itself by another vehicle.

A large number of such hitches, carriers and racks are attachable to the front and/or rear bumpers of a vehicle which affords a convenient mounting surface for such carriers. In attaching such carriers to the vehicle bumper, the attachment members are configured to the specific shape of the vehicle bumper which varies for each type of vehicle or are adjustable so as to be attachable to any type of bumper configuration.

Wind tunnel tests have shown that covered bumpers reduce drag, thereby increasing fuel economy. Thus, a cover strip formed of a flexible material has been mounted between the vehicle body and the top of the bumper to cover the space between the vehicle body and the bumper. This cover strip obstructs the attachment of a rack, carrier, etc. to the vehicle bumper.

Attachment of such carriers and racks to the vehicle bumper is also impeded due to the current trend of forming bumpers of a one piece molded plastic assembly which is mounted flush with the vehicle body and appears to form an integral part of the vehicle body. This effectively prevents the attachment of any type of rack, carrier, etc., to the vehicle bumper.

Thus, it would be desirable to provide a vehicle-attachable carrier which overcomes the problems of previously devised carriers which are attachable to the vehicle bumper. It would also be desirable to provide a vehicle-attachable carrier which is attachable to any vehicle despite the specific bumper configuration on the vehicle. It would also be desirable to provide a vehicle-attachable carrier which is easily attached to the vehicle and which is adapted for mounting a variety of different types of carrying means, such as hitches, racks, carriers, etc., on the vehicle.

SUMMARY OF THE INVENTION

The present invention comprises a carrier which is attachable to a vehicle which preferably includes a bumper mounted to the vehicle frame via a pair of energy absorbing shock absorbers. The carrier includes first and second straps, each having a first portion, an integral depending second portion and an integral third portion which is substantially parallel to the first portion and extends outward from one end of the second portion. Means are provided for mounting the first portion of each of the first and second straps on the energy absorbing shock absorbers on the vehicle such that the second portion of each of the first and second straps extends downward below the bottom of the vehicle bumper and the third portion extends outward beyond the vehicle bumper. Finally, the carrier of the present invention includes means for mounting carrying means to the third portion of each of the first and second straps to provide a carrier, rack or towing attachment.

In one embodiment, the means for mounting the first portion of the first and second straps to the energy absorbing shock absorbers comprises a pair of clamp members having first and second outwardly extending flanges and an integral intermediate arcuate portion. The first and second clamp members are disposed in an inverted arrangement about the energy absorbing shock absorber and secured thereto. The first portion of each of the first and second straps is attached to the clamp members.

In another embodiment, the straps are oriented such that the third portions are positioned parallel to and below the vehicle bumper. The third portions of the straps are slidingly attachable to a cross member extending between the straps such that the lateral distance between the straps can be varied to adapt the carrier of the present invention to any size spacing between the vehicle bumper energy shock absorbers.

In one version, the third portions of the straps are slidingly received within clamp members attached to the ends of the cross member. A fastener extends through a slot formed in the third portions of the straps to provide selective adjustment of the position of the third portions of the straps with respect to the cross member. In another version, the third portions of the straps are slidingly received within an internal slot formed in the cross member and secured thereto by means of suitable fasteners.

A clamp member having a depending, V-shaped, central portion is secured underneath the first portion of each of the straps. The V-shaped central portion of the clamp member receives the energy absorbing bumper shock absorber to prevent lateral movement of the carrier with respect to the energy absorbing bumper shock absorbers.

A threaded set screw is mounted within a depending member attached to the first portion of each of the straps so as to be selectively engagable with the vehicle bumper or the plate utilized to attach the end of the energy absorbing bumper shock absorbers to the vehicle bumper in order to securely hold the carrier of the present invention from fore and aft movement with respect to the bumper of the vehicle.

The vehicle-attachable carrier of the present invention overcomes many of the problems encountered with previously devised bumper mounted carriers, racks, hitches, etc. by enabling such carriers, racks and hitches to be mounted to a vehicle despite the specific configuration of the vehicle bumper. The carrier is easily attached to the energy absorbing bumper shock abosrbers on the vehicle thereby eliminating the need for mounting the carrier itself directly on the vehicle bumper.

The carrier of the present invention is constructed such that it can be mounted on a vehicle which has a bumper configuration which would prevent the attachment of previously devised carriers, racks, hitches, etc. to the vehicle bumper. The depending portion of straps forming a part of the carrier of the present invention are mounted on the vehicle independent of the vehicle bumper so as to enable the carrier to be readily attached to the vehicle.

BRIEF DESCRIPTION OF THE DRAWING

The various features, advantages and other uses of the present invention will become more apparent by referring to the following detailed description and drawing in which;

FIG. 1 is a perspective view of a vehicle-attachable carrier constructed in accordance with the teachings of one embodiment of the present invention;

FIG. 2 is a side elevational view showing the attachment of the carrier of the present invention on the energy absorbing bumper shock absorbers of the vehicle shown in FIG. 1;

FIG. 3 is an end view of a portion of the carrier illustrated in FIG. 1;

DESCRIPTION OF THE PREFERRED EMBODIMENTS

Figure 4:
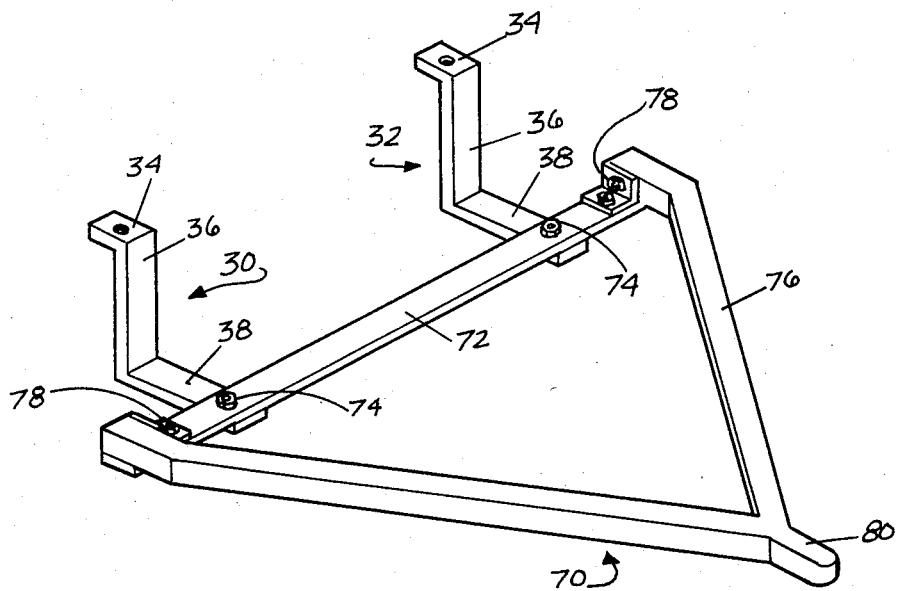
FIG. 4 is a perspective view showing the vehicle attachable carrier of the present invention configured for use as a towing bar.

Throughtout the following description and drawing, an identical reference number is used to refer to the same component shown in multiple figures of the drawing.

Referring now to the drawing, and to FIG. 1 in particular, there is illustrated a carrier 10 which is attachable to a vehicle 12 utilizing energy absorbing shock absorbers 14 and 16 for mounting a bumper 18 to the vehicle frame.

As is conventional, energy absorbing shock absorbers, such as shock absorbers 14 and 16, are utilized to absorb impact on the front or rear bumper of a vehicle so as to minimize the amount of damage to the vehicle during an impact, such as a collision. The energy absorging shock absorbers 14 and 16 are utilized to mount either of the front and rear bumpers of a vehicle to the vehicle frame. Thus, although the following description and illustration depict the use of the carrier of the present invention in conjunction with the energy absorbing shock absorbers used to mount the rear bumper on a vehicle, it will be understood that the carrier of the present invention may also be mounted to the energy absorbing front bumper shock absorbers. It will also be understood that the carrier of the present invention can be mounted on the mounting brackets or straps used to fix the bumpers on the front or rear ends of the vehicle, regardless if such brackets or straps are movable during impact on the bumper, fixed in a stationary position or include a shock absorbing means.

As shown in FIGS. 1 and 2, the energy absorbing shock absorbers, such as shock absorber 14, includes a hollow housing 20 which is mounted to the vehicle frame 22. An extensible and retractable rod 24 is mounted within the housing 20 and extends outward therefrom. The outer end of the rod 24 is attached to the vehicle bumper 18 by suitable means.

As shock absorbing means, such as a fluid, spring, etc., is mounted within the interior of the housing 20 of the shock absorber 14 and acts to retard retraction of the extensible rod 24 within the housing 20 during impact of the bumper 18. This slows the movement of the bumper 18 and absorbs a portion or all of the force exerted on the bumper 18 so as to minimize damage to the vehicle during an impact or collision.

Referring now to FIGS. 1, 2 and 3, a carrier 10 is attachable to the energy absorbing bumper shock absorbers 14 and 16. Throughout the following description, the term "carrier" is meant to include any type of vehicle attachment, such as an article carrier, a towing or trailer hitch, rack, etc., of the type which would conventionally be mounted on the vehicle bumper itself.

The carrier 10 includes first and second straps 30 and 32, respectively. The first and second straps 30 and 32 are identically formed and have a multi-sectional integral configuration comprised of first, second and third integrally connected portion 34, 36 and 38, respectively.

The first portion 34 of each of the first and second straps 30 and 32 has a flat, planar shape. The second portion 36 is integrally formed with the first portion 34 and depends downward from the first portion 34. The third portion 38 is integrally formed with the opposite end of the second portion 36 from the first portion 34 and extends outwardly from the second portion 34 in a direction opposite from the first portion 34 and substantially parallel to the first portion 34. Preferably, the first, second and third portions 34, 36 and 38 are disposed substantially perpendicular to each other.

The carrier 10 of the present invention also includes means for mounting each of the first and second straps 30 and 32 to one of the energy absorbing bumper shock absorbers 14 and 16, respectively, such that the second portion 36 of each of the first and second straps 30 and 32 extends downward below the bottom of the vehicle bumper 18 and the third portion 38 of each of the straps 30 and 32 extends outward beyond the vehicle bumper 18. In one embodiment, the mounting means 40 includes first and second clamp members 42 and 44, respectively, which are arranged in an opposite inverted manner about each of the energy absorbing bumper shock absorbers 14 and 16.

Each of the clamp members 42 and 44 are formed with a pair of outwardly extending planar flange sections 46 and 48. An intermediate, centrally located arcuate portion 50 is integrally formed with and extends between the flange portion 46 and 48 of each of the clamp members 42 and 44. Preferably, the intermediate central portion 50 has a semi-circular configuration which defines an aperture 52 when the first and second clamp members 42 and 44 are secured together about one of the energy absorbing bumper shock absorbers 14 or 16. The size of the intermediate central portion 50 of each of the first and second clamp members 42 and 44 is configured to correspond to the circumference of the housing 20 or the extensible rod 24 of the shock absorber so as to be easily and securely mounted thereabout.

Means are provided for fastening the first and second clamp members 42 and 44 about the energy absorbing bumper shock absorber 14 and 16. Although an type of suitable fastening means may be employed, it is preferred that nuts and bolts be utilized so as to provide easy attachment and removal of the carrier 10 of the present invention on the vehicle 12. Accordingly, apertures are formed in each of the outer flanges 46 and 48 of the clamp members 42 and 44 and are alignable so as to receive a conventional bolt 54 therethrough. The bolts 54 extend through the apertures in the invertedly arranged clamp members 42 and 44 and threadingly receive a nut 56 so as to secure the first and second clamp members 42 and 44 about the energy absorbing bumper shock absorber. In a preferred embodiment, however, the nuts 56 are in the form of weld nuts which are welded to the outer flanges 46 and 48 of one of the clamp members, such as clamp member 44, and aligned with the aperture in the flanges 46 and 48 so as to receive the bolt 54 therethrough.

As shown in FIG. 3, the first portion 34 of each of the first and second straps 30 and 32 is secured to the attachable clamping means 40 by providing an aperture in the first portion 34 of the first and second straps 30 and 32 which is alignable with the apertures in the outer flanges of the clamp members and receives the bolt 54 therethrough so to securely attach the first and second straps 30 and 32 to the inverted clamp members 42 and 44. When the attaching clamp members 42 and 44 are mounted about the energy absorbing bumper shock absorbers 14 and 16, and the first and second straps 30 and 32 are secured thereto, the second portion 36 of each of the straps 30 and 32 will extend downward from the energy absorbing bumper shock absorbers 14 and 16 below the bottom of the vehicle bumper 18 and the third portion 38 of each of the straps 30 and 32 will extend outward beyond the vehicle bumper 18 as shown in detail in FIG. 2.

The third portion 38 of each of the first and second straps 30 and 32 define a means for mounting a carrying means onto the first and second straps 30 and 32. The carrying means may comprise any type of conventional trailer hitch, towing bar, article carrying rack, carrier, etc.

As shown in FIG. 1, the carrying means comprises a hitch 60 for attaching a trailer, not shown, to the vehicle 12. The hitch 60 includes a horizontally extending bar 62 which is joined to the third portions 38 of the first and second straps 30 and 32 at opposite ends by suitable means, such as welding or by fasteners 64 which extend through aligned apertures in the ends of the bar 62 and the outer ends of the third portions 38 of the first and second straps 30 and 32. A conventional hitch ball 66 is mounted centrally on the bar 62 and provides a means for attaching a trailer to the carrier 10.

Alternately, the carrying means may comprise a conventional towing bar 70 as shown in FIG. 4. In this embodiment, the towing bar 70 includes a horizontally extending bar 72 which is attached to the outer ends of the third portions 38 of the first and second straps 30 and 32 by suitable means, such as by nuts and bolts 74. A Y-shaped member 76 is attached to the outer ends of the horizontal bar 72 by means of interconnecting angle brackets 78. The front or yoke portion 80 of the Y-shaped member 76 provides a means for attaching the towing bar 70 to another vehicle for towing of the vehicle 12 to which the carrier 10 of the present invention is attached.

Figure 5:
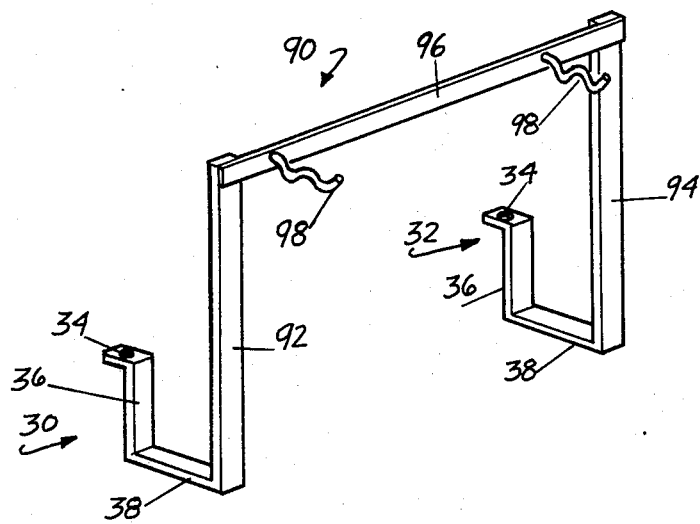
FIG. 5 is a perspective view of a vehicle attachable carrier of the present invention configured for use as a bicycle rack.

Finally, the carrying means may comprise an upstanding rack 90 which is configured to carry and support bicycles, not shown. The rack 90 includes upstanding leg members 92 and 94 which are interconnected at their upper ends by horizontally extending bar 96. The lower ends of the leg members 92 and 94 are secured to the outer ends of the third portions 38 of the first and second straps 30 and 32 by conventional means. Alternately, the upstanding legs 92 and 94 may be integrally formed with the straps 30 and 32 as shown in FIG. 5. A pair of hangers 98 are mounted on the horizontal bar 96 to provide a means for supporting a bicycle on the rack 90.

Figure 6:
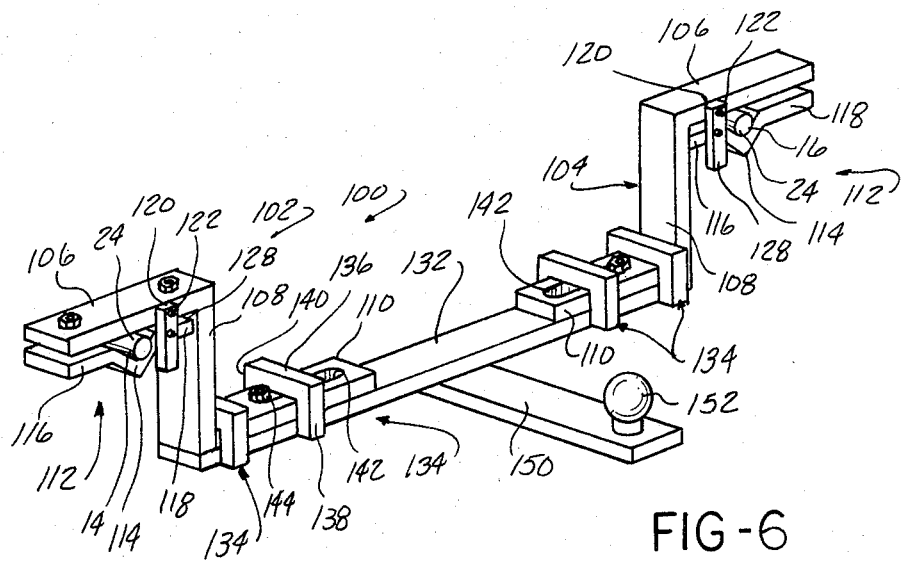
FIG. 6 is aperspective view of another embodiment of the vehicle-attachable carrier of the present invention.
Figure 7:
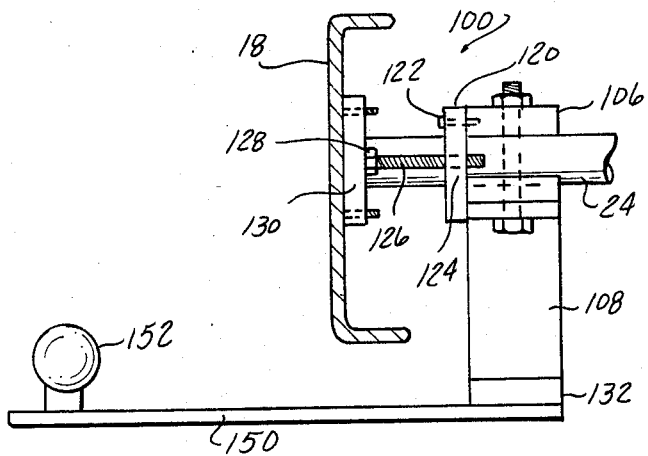
FIG. 7 is a right-hand, side view of the vehicle-attachable carrier shown in FIG. 6.

Referring now to FIGS. 6 and 7, there is illustrated another, more preferred embodiment of the vehicle-attachable carrier of the present invention. In this embodiment, the vehicle-attachable carrier includes first and second straps 102 and 104, respectively. Each of the first and second straps 102 and 104 is formed with first, second and thrid integral portions 106, 108 and 110, respectively. The second portion 108 depends from one end of the first portion 106. The third portion 110 is integrally formed with the opposite end of the second portion 108 and extends outward therefrom, substantially parallel to but in an opposite direction from the first portion 106 of the first and second straps 102 and 104.

The vehicle attachable carrier 100 is provided with a first mounting means for attaching the first and second straps 102 and 104 to the bumper attachment means or, preferably to the vehicle energy absorbing bumper shock absorbers 14 and 16. Preferably, the first mounting means includes a clamp member 112 having a central, depending V-shaped portion 114 and two, integral, outwardly extending, flanges 116 and 118. Suitable fasteners 120 are used to attach the clamp members 112 to the first portions 106 of the first members 102 and 104. When the clamp members 112 are attached to the first portion 106 of the strap members 102 and 104, the V-shaped central portion 114 of the clamp members 112 define an aperture which receives the energy absorbing bumper shock absorbers 14 and 16. The housing 20 or the extensible rod 24 of the shock absorbers 14 and 16 extends through the aperture formed between the clamp member 112 and the first portions 106 of the straps 102 and 104 and is securely held in position to prevent lateral or sideways movement of the vehicle attachble carrier with respect to the shock absorbers 14 and 16.

Adjustable means are also provided to securely the position the vehicle-attachable carrier 100 with respect to the vehicle to prevent fore and aft movement of the carrier 100 with respect to the vehicle and/or vehicle bumper. A depending plate 120 is secured to the first portions 106 of the straps 102 and 104 by suitable fasteners 122. A threaded bore 124 is formed in the plate 120 and threadingly receives an elongated positioning means, such as a threaded screw 126 having an outer head 128. The positioning screw 126 is threadingly adjustable with respect to the plate 120 so as to place the head 128 of the screw 126 into engagement with the vehicle bumper 18 or the plate 130 attached to the bumper 18 which is used to mount the extensible rod 24 of the vehicle shock absorbers to the bumper 18 as shown in FIG. 7. In this manner, the vehicle attachable carrier 100 is secured in a fixed longitudinal position relative to the bumper 18.

Second mounting means are also provided for attaching a carrying device, such as an article carrier, trailer hitch, rack, etc., to the vehicle attachable carrier 100. As shown in FIGS. 6 and 7, the second mounting means includes an elongated cross member 132 which extends between the first and second straps 102 and 104 and is positioned below the third portions 110 of the first and second straps 102 and 104. At least one and preferably a plurality of U-shaped clamp members 134 are provided for securing the straps 102 and 104 to the cross member 132. Each of the clamp members 134 has a U-shaped configuration formed of a central portion 136 and two, spaced, depending legs 138 and 140, respectively. The legs 138 and 140 are secured to the outer side edges of the cross member 132 by suitable means, such as by welding. The central portion 136 of the clamp members 134 is spaced above the upper surface of the cross member 132 to define an aperture which slidingly receives the third portion 110 of the strap portions 102 and 104.

An elongated slot 142 is formed in the third portion 110 of each of the straps 102 and 104 and receives a fastener 144 which is engagable with a threaded aperture formed in the cross member 132, not shown. In this manner, the lateral position of each of the straps 102 and 104 may be slidingly adjusted with respect to the cross member 132 to enable the vehicle-attachable carrier 100 of the present invention to be mounted on any size vehicle despite the spacing between bumper mounting means, such as the energy absorbing bumper shock absorbers on the vehicle.

An outward extending member 150 is attached to the cross member 132 and extends, rearward from the bumper 18 of the vehicle as shown in FIG. 7. A trailer hitch 152 may be mounted on the outer end of the outward extending member 150 for attaching a conventional trailer to the vehicle-attachable carrier of the present invention. Alternately, the yoke portions of the trailer bar 70 shown in FIG. 4 may be attached an elongated end portion of the cross member 132 for attaching a towing bar to the carrier 100.

Figure 8:
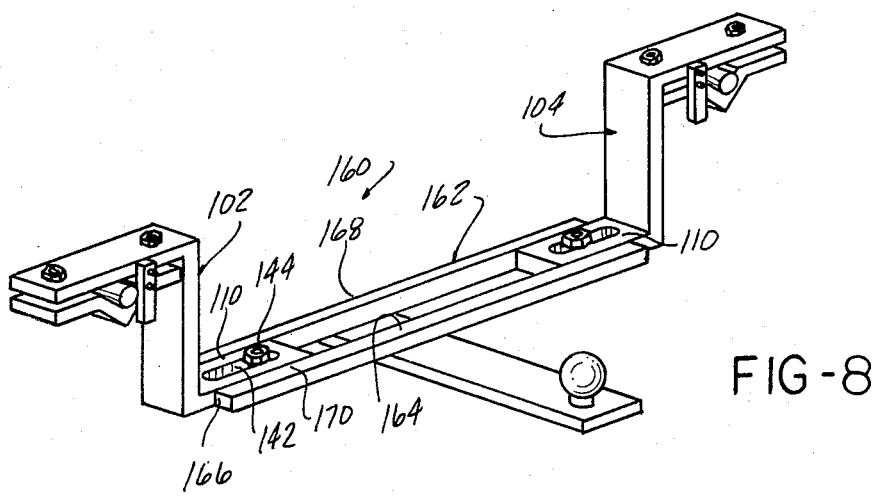
FIG. 8 is a perspective view of yet another embodiment of the vehicle-attachable carrier of the present invention.

Another embodiment of the vehicle-attachable carrier of the present invention is illustrated in FIG. 8. In this embodiment, the vehicle-attachable carrrier 160 is provided with a first and second straps 102 and 104 identical to the straps 102 and 104 described above and shown in FIGS. 6 and 7. However, the cross member 162 is provided with an internal, longitudinally extending slot 164 which is formed by constructing the cross member 162 with a central, lower portion 166 and two upwardly extending, spaced, side legs 168 and 170, respectively. The slot 164 is formed between the side legs 168 and 170 and the central, lower portion 166.

The third portions 110 of the first and second straps 102 and 104 are slidingly insertable within opposed ends of the slot 164. The internal slot 142 in each of the third portions 110 receives the fastener 144 which is inserted through a threaded aperture formed in the central portion 166 of the cross member 162 to securely position and mount the straps 102 and 104 within the cross member 162 at any desired lateral spacing on the cross member 162.

In summary, there has been disclosed a vehicle-attachable carrier which is mountable on the energy absorbing shock absorbers which are utilized to attach a bumper to the vehicle farme. The vehicle-attachable carrier of the present invention may be attached to the vehicle independent from the bumper and therefore may be used on any vehicle regardless of the configuration of the vehicle bumper. The carrier of the present invention is easy to attach to the vehicle and may be adapted for mounting a variety of carrying means, such as trailer hitches, towing bars and racks thereon, so as to expand its potential range of application.

What is claimed is:

1. An apparatus for mounting an article carrier on a vehicle having a bumper mounted on the vehicle via support members comprising:
   strap means, each having first and second opposed ends;
   first means for mounting the first end of the strap means to the support members such that the second end of the strap means extends downward below the bottom of the vehicle bumper;
   second means, attached to the second end of the strap means, for mounting an article carrier to the strap means rearward of the vehicle bumper, the second mounting means including a cross member secured to and extending between the second ends of the strap means; and
   means for adjustably attaching the second end of the strap means to the cross member, the adjustable attaching means including:
   first and second clamp members mounted to the cross member and defining an aperture between the clamp members and the cross member;
   the second end of the strap means being slidably extendable through the aperture between the clamp members and the cross member; and
   fastening means for securing the second end of the strap means in a pre-determined position to the cross member.

2. The apparatus of claim 1 wherein an elongated slot is formed in the second end of the strap means and the fastening means is selectively inserted through the slot into an aperture formed in the cross member.

3. An apparatus for mounting an article carrier on a vehicle having a bumper mounted on the vehicle via support members comprising:
   strap means, each having first and second opposed ends;
   first means for mounting the first end of the strap means to the support members such that the second end of the strap means extends downward below the bottom of the vehicle bumper the first mounting means including:
   a first member having a depending, V-shaped, central portion and two, opposed, outwardly extending flanges; and
   fastening means for fastening the flanges to the first end of the strap means such that the V-shaped central position of the first member and the first end of the strap means define an aperture for receiving the bumper support member therein;
   second means, attached to the second end of the strap means, for mounting an article carrier to the strap means rearward of the vehicle bumper; and
   means for fixedly positioning the apparatus longitudinally with respect to the vehicle bumper, the positioning means comprising:
   a plate secured to the strap means;
   a threaded bore formed in the plate;
   a strap member threadingly extensible and retractable within the threaded bore in the plate so as to be brought into engagement with the bumper to prevent longitudinal movement of the apparatus with respect to the bumper.

4. An apparatus for mounting an article carrier on a vehicle having a bumper mounted on the vehicle via energy absorbing shock absorbers comprising:
   first and second straps, each having a first portion, an integral, depending second portion and an integral, third portion extenidng outward from the second portion opposite and parallel to the first portion;

clamp members, each having a depending central portion respectively secureable to the first portion of the first and second straps such that the first portion of the first and second straps and the depending central portion of the clamp members define apertures for surrounding the energy absorbing bumper shock absorber such that the second portion of the first and second straps extend downward below the bottom of the bumper;

a cross member extending between the first and second straps and carrying an article carrier attachment means thereon rearward of the vehicle bumper;

a plurality of U-shaped straps mounted on the cross member and forming an aperture for sliding receiving the third portions of the first and second straps;

means for securing the third portions of the first and second straps in a pre-determined position on the cross member.

5. A carrier for a vehicle having a bumper mounted to the vehicle frame via a pair of energy absorbing shock absorbers comprising:

first and second straps, each having a first portion, an integrally depending second portion and an integral third portion extending outward from the second portion in a direction opposite from the first portion and substantially parallel to the first portion;

means for mounting the first portion of each of the first and second straps to one of the energy absorbing shock absorbers such that the second portion of each of the first and second straps extends downward below the bottom of the vehicle bumper and the third portion of each of the first and second straps extends outward beyond the vehicle bumper; and means for mounting a carrying means to the third portion of each of the first and second straps.

6. The carrier of claim 5 wherein the mounting means for each of the first and second straps comprises:

first and second clamp members having aligned outer flanges and an intermediate central arcuate portion; and means for fastening the first and second clamp members in an inverted aligned arrangement about the energy absorbing bumper shock absorbers such that the intermediate central arcuate portion surrounds the energy absorption bumper shock absorbers.

7. The carrier of claim 5 wherein the first, second and third portions of each of the first and second straps are disposed substantially perpendicular to each other.

8. The carrier of claim 5 wherein the carrier means comprises a hitch including:

a horizontally extending bar member secured to and extending between the third portions of each of the first and second straps; and a hitch ball member mounted on the horizontally extending bar member.

9. The carrier of claim 5 wherein the carrying means comprises a towing bar including:

a horizontally extending bar member extending between and secured to the third portion of each of the first and second straps; and a substantially Y-shaped member secured to the outer ends of the horizontally extending member.

10. The carrier of claim 5 wherein the carrying means comprises a rack including:

first and second vertically extending leg members attached to the third portions of each of the first and second straps;

an upper horizontally bar extending between and secured to the first and second legs; and hanger means mounted on the horizontally extending bar for supporting an article thereon.

11. A carrier for a vehicle having a bumper mounted to the vehicle frame via a pair of energy absorbing shock absorbers comprising:

first and second straps, each having a first portion, an integral second portion depending from the first portion and an integral third portion extending outward from the second portion in a direction opposite from the first portion and substantially parallel to the first portion;

a pair of first and second clamp members each having aligned outer flanges and an intermediate arcuate-shaped central portion;

means for fastening the first and second clamp members together in an inverted manner about the energy absorbing bumper shock absorbers such that the intermediate arcuate portions surround the energy absorbing shock absorbers;

the first portion of the first and second straps being secured to the joined first and second clamp member such that the second portion of each of the first and second straps extends downward below the bottom of the bumper and the third portion of each of the first and second straps extends outward beyond the bumper; and means for mounting a carrying means to the third portins of each of the first and second straps.

12. An apparatus for mounting an article carrier on a vehicle having a bumper mounted on the vehicle via support members comprising:

strap means, each having first and second opposed ends;

first means for mounting the first end of the strap means to the support members such that the second end of the strap means extends downward below the bottom of the vehicle bumper;

second means, attached to the second end of the strap means, for mounting an article carrier to the strap means rearward of the vehicle bumper, the second mounting means including a cross member secured to and extending between the second ends of the strap means; and means for adjustably attaching the second end of the strap means to the cross member, the adjustable attaching means including:

the cross member having an internal, depending slot with an open top end;

the second ends of the strap means slidingly extending within the slot on the cross member; and fastening means for securing the second end of the strap means at a pre-determined position in the slot in the cross member.

* * * * *